Figure 1:
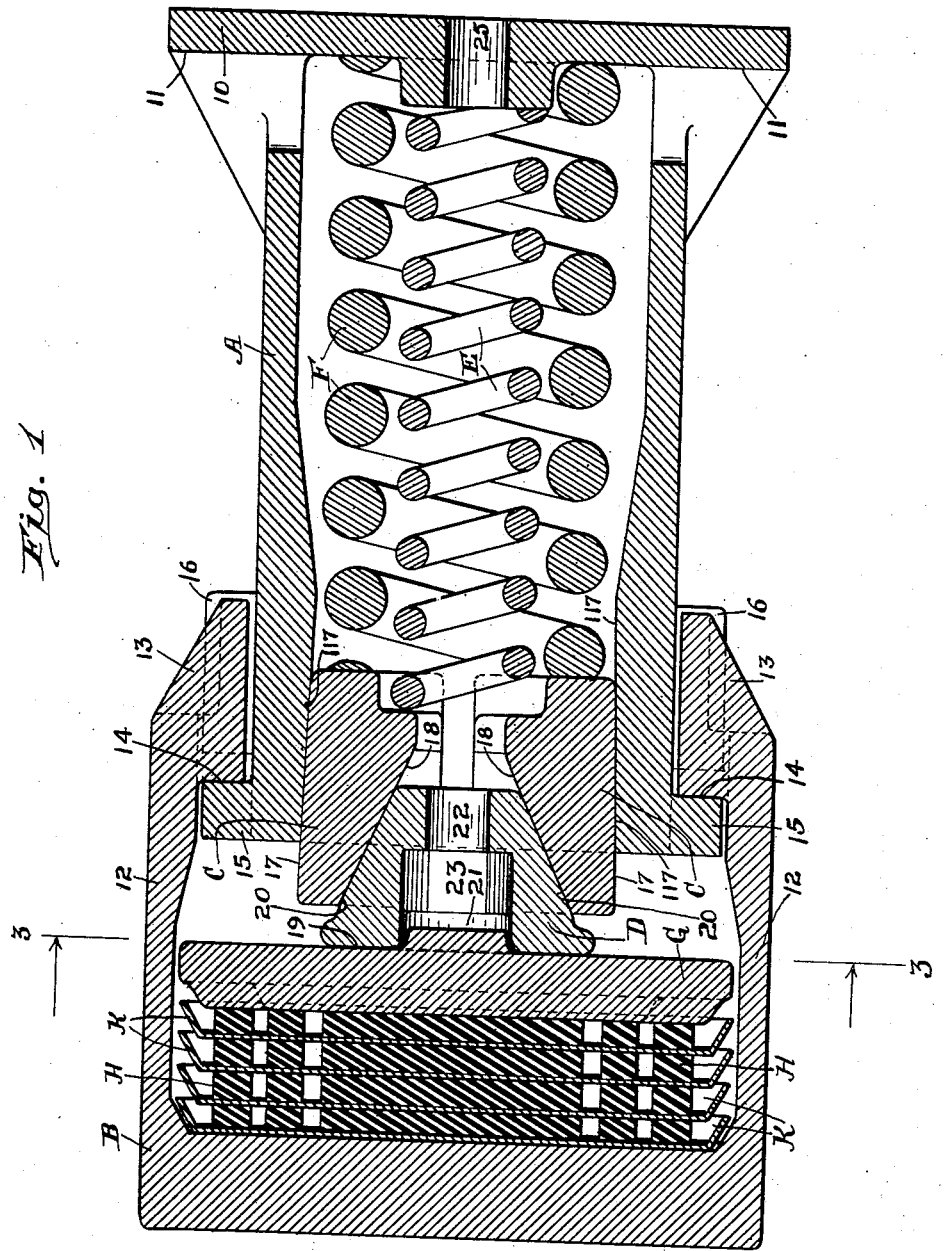

Aug. 24, 1954 V. S. DANIELSON ET AL 2,687,219
COMBINED RUBBER AND FRICTION SHOCK ABSORBING MECHANISM
Filed July 31, 1951 3 Sheets-Sheet 1

Inventors:
Vernon S. Danielson,
William D. Wallace.
By Henry Fuchs
Atty.

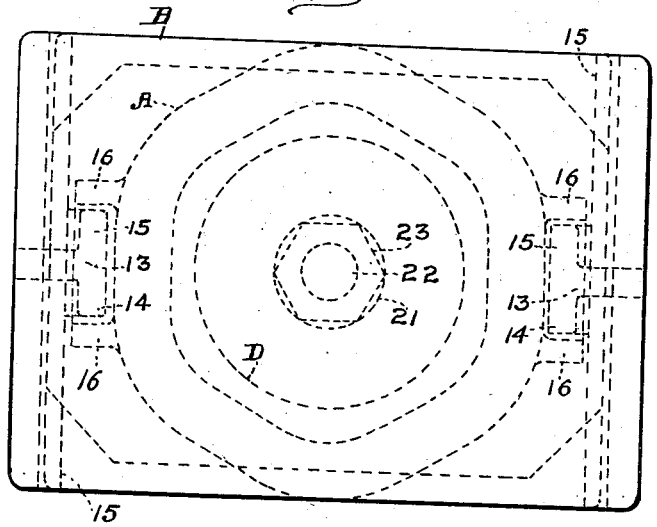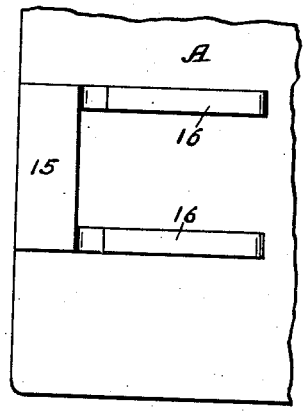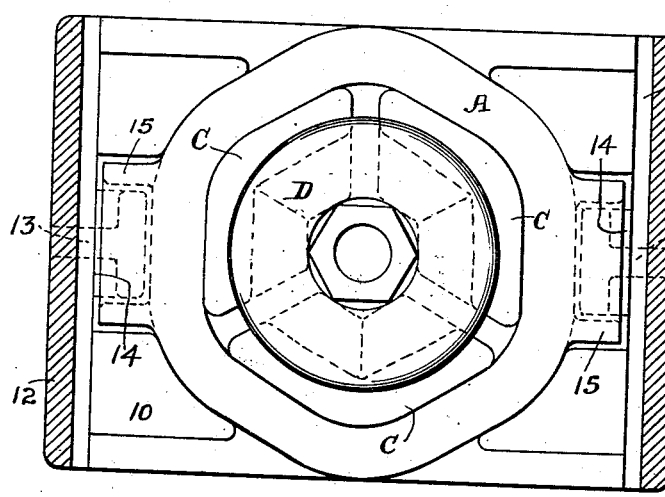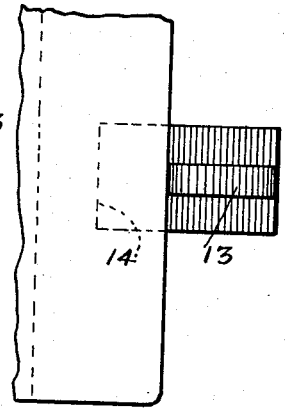

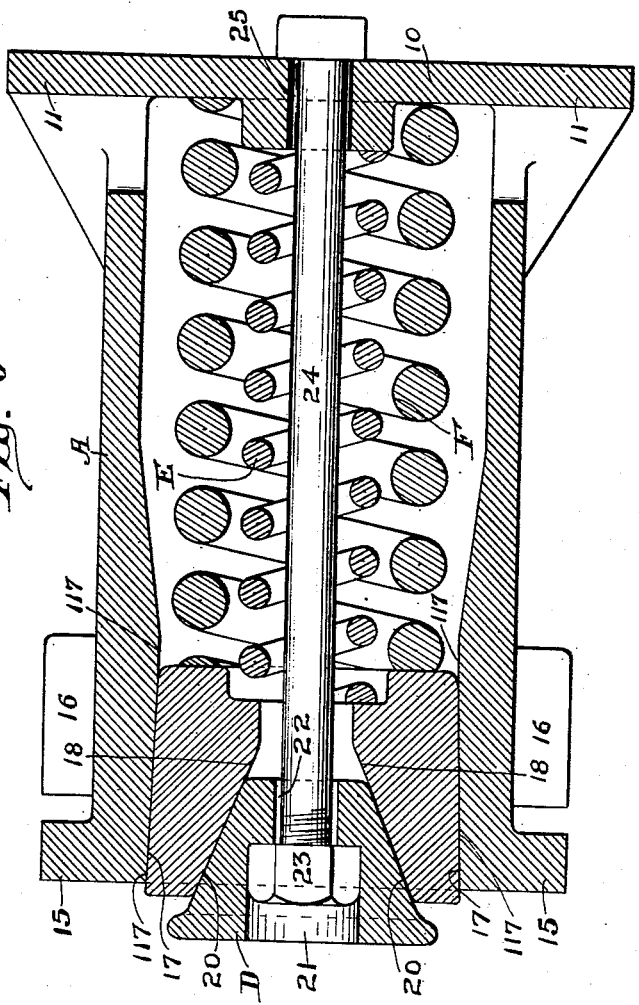

Patented Aug. 24, 1954

2,687,219

UNITED STATES PATENT OFFICE 2,687,219

COMBINED RUBBER AND FRICTION SHOCK ABSORBING MECHANISM

Vernon S. Danielson, Dolton, and William D. Wallace, Park Forest, Ill., assignors to W. H. Miner, Inc., Chicago, Ill., a corporation of Delaware Application July 31, 1951, Serial No. 239,522

2 Claims. (Cl. 213—24)

This invention relates to improvements in combined rubber and friction shock absorbing mechanisms for draft riggings of railway cars.

One object of the invention is to provide a combined rubber and friction shock absorbing mechanism, comprising a friction casing, a spring resisted friction clutch slidingly telescoped within the casing, a front follower member movable lengthwise of the mechanism toward and away from the casing, cooperating stops on the casing and front follower member for limiting outward movement of the front follower member with respect to the casing, a follower plate engaging the friction clutch; and a rubber cushioning unit interposed and reacting between said follower plate and front follower member, both the friction mechanism and the rubber unit being under initial compression, the rubber cushioning unit being under compression between the follower plate and front follower.

A more specific object of the invention is to provide a combined rubber and friction shock absorber, particularly designed for railway draft riggings, comprising a friction shock absorbing means including a friction casing open at its front end and having an integral rear follower member at its rear end engaged with the usual rear stop lugs of the underframe structure of a railway car, friction shoes slidingly telescoped within the open end of the casing, a central wedge having wedging engagement with the shoes, and springs within the casing yieldingly opposing inward movement of the shoes, a follower plate bearing on the outer end of the wedge and engageable with the front end of the casing to limit compression of the friction shock absorbing means, a front follower member cooperating with the usual front stop lugs of the railway draft rigging and having rearwardly extending arms at opposite sides thereof embracing said follower plate and shouldered engagement with stop shoulders on the casing for limiting outward movement of said front follower member, and a rubber cushioning unit interposed and reacting between said front follower member and follower plate, said rubber cushioning unit and the springs of the friction shock absorbing means being under initial compression in the assembled condition of the mechanism.

Other objects of the invention will more clearly appear from the description and claims hereinafter following.

In the accompanying drawings forming a part of this specification, Figure 1 is a horizontal, longitudinal sectional view of our improved combined friction and rubber shock absorbing mechanism. Figure 2 is a front elevational view of Figure 1, looking from left to right in said figure. Figure 3 is a transverse, vertical sectional view, corresponding substantially to the line 3—3 of Figure 1. Figure 4 is a broken side elevational view of the front end portion of the friction casing, looking from right to left in Figure 2. Figure 5 is a broken side elevational view of the front follower member shown in Figure 2, looking from right to left in said figure. Figure 6 is a view, similar to Figure 1, with the front follower member, follower plate, and rubber cushioning unit omitted, and showing the friction mechanism held in compressed condition by a bolt to facilitate assembling of the same with the front follower member, the follower plate, and rubber cushioning unit.

Our combined friction and rubber shock absorbing mechanism comprises broadly a friction casing A, a front follower member B, a set of three friction shoes C—C—C, a wedge block D, coil springs E and F, a follower plate G, a series of rubber mats or pads H—H, and a series of spacing members K—K, the latter being alternated with the mats H—H.

The friction casing A is in the form of a hollow, tubular member of hexagonal, transverse cross section. This casing A is open at its front end and closed at its rear end by a transverse wall 10, which projects beyond the opposite sides of said casing, as shown most clearly in Figures 1, 2, 3, and 6, said projecting portions being indicated by 11—11 and, together with the main body of said wall 10, forming a rear follower member, which is integral with the casing.

The front follower member B is in the form of a relatively thick plate, having rearwardly projecting side arms 12—12 extending a short distance rearwardly beyond the front end of the casing A and provided with inwardly projecting, rearwardly extending, central guide lugs 13—13 at their front ends, presenting transverse shoulders 14—14 at the forward sides thereof engaged in back of transverse stop projections 15—15 at opposite sides of the front end portion of the casing A. Each lug 13 is guided between spaced ribs 16—16 formed on the casing A, rearwardly of the corresponding stop projection 15.

The friction shoes C, which are three in number, are telescoped within the casing A and are provided with longitudinally extending, V-shaped friction surfaces 17 in sliding engagement with longitudinally extending, V-shaped, interior friction surfaces 117 provided on the casing A. Each shoe C has a V-shaped wedge face 18 on its inner side.

The wedge D is in the form of a block having a flat, transverse, front end face 19 and three V-shaped wedge faces 20—20—20 at its inner end, arranged symmetrically about the central, longitudinal axis of the casing A and engaging, respectively, the wedge faces 18—18—18 of the shoes C—C—C. The block D is further provided with a forwardly opening pocket 21 and a central bore or opening 22, communicating with said pocket. The pocket 21 is preferably of hexagonal cross section, and a hexagonal nut 23 is seated in said pocket. The nut 23 is employed in connection with the operation of assembling the mechanism, as hereinafter pointed out.

The springs E and F are disposed within the casing A, each spring being in the form of a helical coil having its opposite ends bearing on the inner ends of the shoes C—C—C and the end wall 10 of the casing A.

The follower plate G, which is of substantially rectangular outline, is disposed between the arms 12—12 of the front follower member B and bears on the flat front end face 19 of the wedge D.

The rubber mats or pads H and the spacing members K, which together form a cushioning unit, are disposed between the front follower member B and the follower plate G and are embraced by the arms 12—12 of the follower member B, the spacing members K being alternated with the mats or pads. Each spacing member K is preferably in the form of a pan-shaped element within which the corresponding mat or pad is fixed by being vulcanized thereto. In the completely assembled condition of the mechanism, the rubber cushioning unit, comprising the mats or pads H and the spacing members K, is held under a predetermined amount of initial compression between the front follower member B and the plate G, the latter being pressed forwardly by the springs E and F, which are also under initial compression in the assembled condition of the mechanism, the follower plate G being under forward pressure of the wedge block D and shoes C—C—C with which the springs E and F are engaged.

In assembling the mechanism, the wedge D, with the nut 23 seated in the pocket thereof, the friction shoes C—C—C, and springs E and F are first placed within the casing A. The mechanism thus far assembled is then compressed and clamped in compressed condition, as shown in Figure 6, by the retainer bolt 24. As shown in Figure 6, the rear wall 10 of the casing A is provided with a central opening 25 to accommodate the shank of the retainer bolt 24. With the mechanism compressed as illustrated in Figure 6, the shank of the retainer bolt 24 is passed through the opening 25 of the wall 10 of the casing and the opening or bore 22 of the wedge block D to engage its threaded front end with the nut 23. The bolt is then turned to thread the same into the nut 23 and clamp the parts in the position shown in Figure 6. With the parts of the friction shock absorbing means thus held by the bolt 24, the front follower B is applied to the casing A by first disposing the same alongside the casing A with the shoulders 14—14 of the lugs 13—13 of the arms 12—12 positioned so that the shoulders 14—14 thereof will clear the rear ends of the ribs 16—16 and 16—16 of the casing A when the follower member is displaced laterally inwardly with respect to the casing A. With the follower member B thus positioned, the same is moved laterally inwardly with respect to the casing A to dispose the lugs 13—13 in back of the ribs 16—16 and 16—16 in alignment with the openings therebetween. After this has been done, the follower member B is pulled forwardly until arrested by engagement of the lugs 13—13 with the stop projections 15—15 of the casing A. With the front follower B thus positioned, the mats H, spacing members K, and follower plate G are placed between the front follower member B and the wedge D by passing the same edgewise between the arms 12—12 of the follower member B, the follower plate G being placed at the inner end of the rubber unit, as shown in Figure 1. The bolt 24 is then removed, permitting the springs E and F to expand and project the shoes C—C—C and the wedge block D forwardly, forcing the wedge block D against the follower G to compress the rubber unit, comprising the pads H and spacing members K against the follower member B, thereby placing said rubber unit under the desired amount of predetermined initial compression. As will be evident, in the final completely assembled condition of the mechanism, both the rubber unit and the springs E and F are under initial compression.

The operation of our improved shock absorbing mechanism is as follows: During compression of the mechanism, the front follower member B and the friction casing A are moved respectively toward each other, thereby compressing the rubber unit against the follower plate G, forcing the latter toward the casing A and the wedge D inwardly of the casing A. As the wedge D moves inwardly, the shoes C—C—C are wedged apart and slid inwardly along the friction surfaces of the casing against the resistance of the springs E and F, thereby providing frictional resistance to shocks. Compression of the mechanism is limited when the follower plate G comes into engagement with the front end of the casing A.

We claim:

1. In a shock absorbing mechanism, the combination with a friction casing; of friction shoes slidingly telescoped within the casing; springs within the casing bearing on said shoes and opposing inward movement thereof; a wedge block in wedging engagement with the shoe; a front follower member having arms extending rearwardly therefrom; cooperating shoulders on said arms and casing for limiting outward movement of said follower member; a follower plate bearing on said wedge block, said wedge block engaging only said follower plate and shoes; and a rubber cushioning unit interposed between and bearing at opposite ends on said follower member and follower plate.

2. In a shock absorbing mechanism, the combination with a friction casing; of friction shoes slidingly telescoped within the casing; springs under initial compression within the casing bearing on said shoes and opposing inward movement thereof; a wedge block in wedging engagement with the shoes; a front follower member having arms extending rearwardly therefrom; cooperating shoulders on said arms and casing for limiting outward movement of said follower member; a follower plate bearing on said wedge block, said wedge block engaging only said follower plate and shoes; and a rubber cushioning unit under initial compression interposed between and bearing at opposite ends on said follower member and follower plate.

References Cited in the file of this patent

UNITED STATES PATENTS

| Number | Name | Date |
| --- | --- | --- |
| 2,141,680 | Barrows | Dec. 28, 1938 |
| 2,423,877 | Dath | July 15, 1947 |
| 2,429,672 | Dath | Oct. 28, 1947 |
| 2,431,736 | Dath | Dec. 2, 1947 |
| 2,451,569 | Lounsbury | Oct. 19, 1948 |
| 2,458,572 | Dentley | Jan. 11, 1949 |